June 21, 1966   J. R. McCONNELL   3,257,540
STRUCTURAL STEEL FABRICATING APPARATUS
Filed Jan. 3, 1963   2 Sheets-Sheet 1
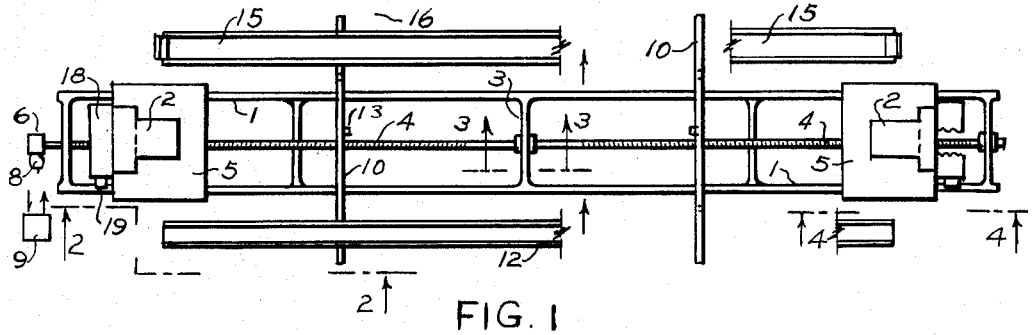
FIG. 1
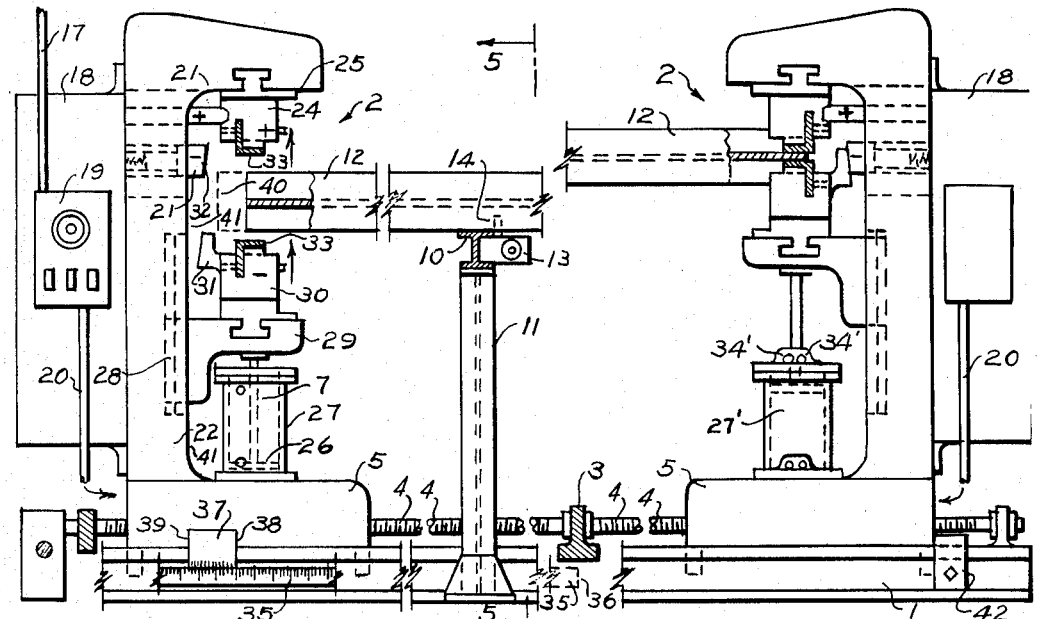
FIG. 2   FIG. 3   FIG. 4
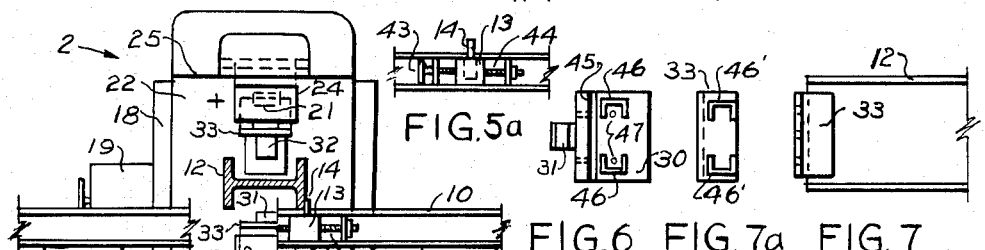
FIG. 6   FIG. 7a   FIG. 7
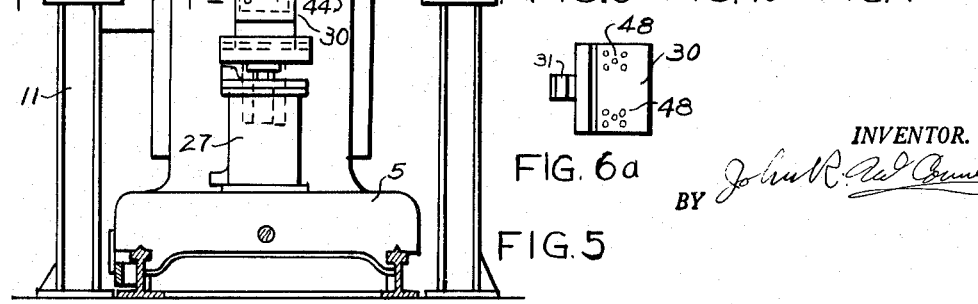
FIG. 6a
FIG. 5
INVENTOR.
John R. McConnell
BY June 21, 1966 J. R. McCONNELL 3,257,540
STRUCTURAL STEEL FABRICATING APPARATUS
Filed Jan. 3, 1963 2 Sheets-Sheet 2
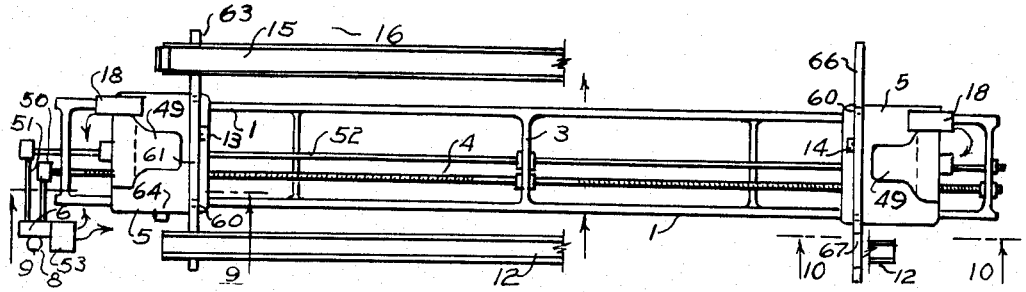
FIG. 8
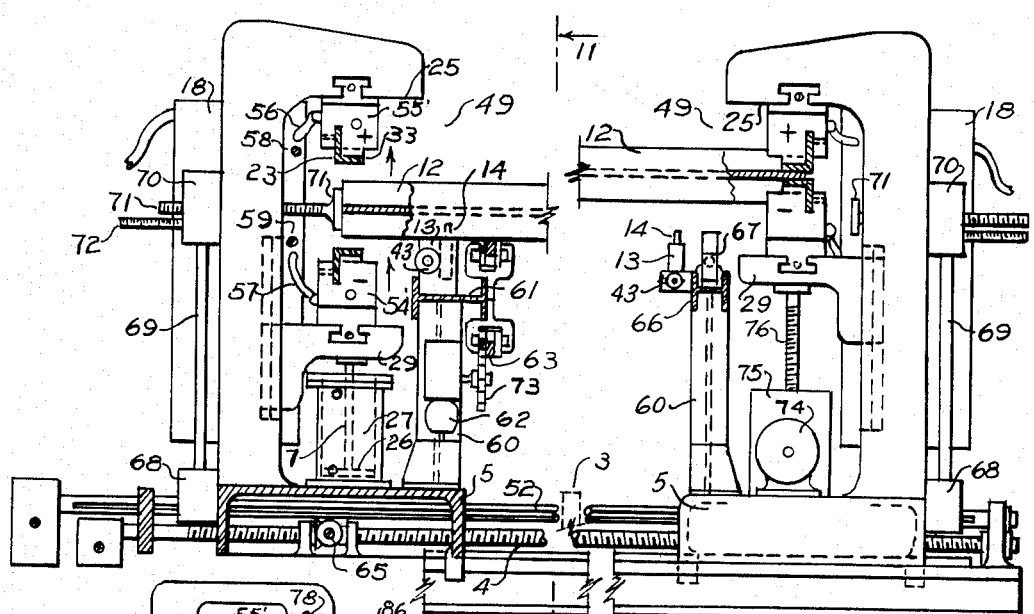
FIG. 9  FIG. 10
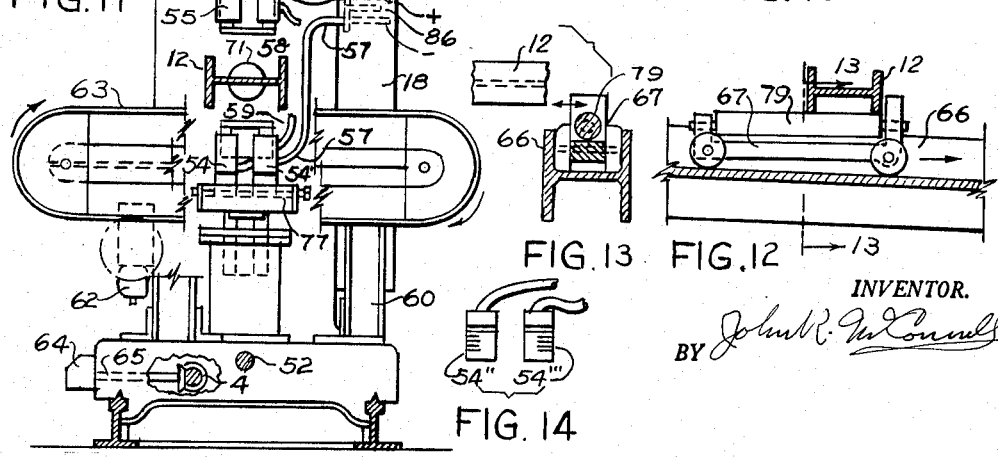
FIG. 11  FIG. 13  FIG. 12
FIG. 14
INVENTOR.
John R. McConnell
BY

United States Patent Office 3,257,540
Patented June 21, 1966

3,257,540
STRUCTURAL STEEL FABRICATING APPARATUS
John R. McConnell, 148 Woodside Ave., Ridgewood, N.J.
Filed Jan. 3, 1963, Ser. No. 249,205
8 Claims. (Cl. 219—80)

This application is a continuation-in-part of inventor's co-pending application Serial No. 563,662 of February 6, 1956, now Patent No. 3,085,148, issued April 9, 1963.

The invention of this application relates to an apparatus for the mechanized fabrication of structural steel members.

It is an object of the present invention to set forth an apparatus for the automatic conveying, positioning, measuring, laying out, assembling and fastening together of the plural component workpieces by an integrated resistance-welding apparatus in the production of completed structural members.

The primary objective is to provide an integrated co-acting apparatus and procedure that will perform all the operations required in the production of a somewhat restricted class of structural members. Said unit members will be completely finished unitary end products, ready for erection-assembly in a structure.

Another objective is to provide a versatile flexible apparatus for the rapid, economical movement of the material with the fabrication performed in one simultaneous, multi-pronged operation.

It is also an objective to provide an adjustable apparatus that will quickly process members of various lengths, depths, widths, and weights.

Still another objective is to provide a means of applying the welding current to minimize the instantaneous current demand.

Another objective is to provide a basic apparatus that, with other types of fabricating heads, can perform allied fabricating operations such as punching and reviewing.

For other objects and for a better understanding of the invention, reefrence may be had to the following detailed description taken in conjunction with the accompanying drawings in which:

FIGURE 1 is a plan layout of a transverse feed beam welding apparatus.

FIGURE 2 is a side elevation of the resistance welding unit taken on FIGURE 1.

FIGURE 3 is a cross-section of the mid-length shaft anchorage taken on FIGURE 1.

FIGURE 4 is a side elevation of the opposite hand end welding unit taken on FIGURE 1.

FIGURE 5 is an end elevation of the end welder and shape transmission rail.

FIGURE 5a is a detail of the shape arresting adjustable stop pin.

FIGURE 6 is a plan view of the contact face of the slotted welding die.

FIGURE 6a is a plan view of the contact face of the alternate slotted welding die.

FIGURE 7 is a side view of the end dual connection angles welded to the end of a member.

FIGURE 7a is a face view of the contact face of one type of connection angle.

FIGURE 8 is a plan-layout of an alternate transverse feed beam welding apparatus.

FIGURE 9 is a side elevation, partly in section, of the end resistance welding unit taken on FIGURE 8.

FIGURE 10 is a side elevation of an alternate end resistance welding unit taken on FIGURE 8.

FIGURE 11 is a front elevation of the end welding unit taken on FIGURE 9.

FIGURE 12 is a side view, partly in section, of the shape carrying buggy on the transverse beam.

FIGURE 13 is a cross-section of the buggy taken on FIGURE 12.

FIGURE 14 is a plan view of the contact faces of the split two-part welding dies with separate electric leads.

Although the invention is illustrated for and primarily designed for the fabrication of beams and girders by the electric-resistance welding process, the basic principles and procedures of the overall layout and the progression and handling of the material throughout the integrated process may be used for various other fabricating operations. This is borne out in applicant's co-pending application on Drilling, Riveting and Bolting of Structural Members, Serial No. 357,206, that is based on the above features. Patents Numbers 3,085,148 and 3,127,661 issued to the applicant show applications to other types of fabricating operations.

In the preferred embodiment of the invention, the end fabricators, fitted with dual welding heads, are symmetrically diverged from the central anchorage by the rotation of the oppositely threaded relocating shaft to pre-locate their operating centres a distance apart equal to the effective distance required by the end details of the member. Geared to the said shaft, a length measuring dial continuously indicates the distance from the anchorage to the fabricator's operating centres. The raw shape is then placed on the dual conveyor belts and the actuation of the said belts moves the shape transversely to the dual stop-pins that locate it under the fabricating heads and stop the belts. The opposed dual end rams are then equally projected against the ends of the flanges of the shape by the rotation of the keyed shaft to length-centre the intermediate shape between the fabricators. The pistons and lower platens then vertically converge the dual welding heads, carrying dual connection angles, against opposite sides of the web at both ends of the intermediately located shape. Welding current through the three pieces creates a compound-chain weld. The lower platen is then lowered allowing the shape with the attached connection angles to rest on the belts. The adjustable length, two-part welding heads can then be set to a different length to create, on a second elevation of the platens, a second pair of spot-welds closer together. On completion of required plural welding, the rams, welding heads and stop-pins are withdrawn and the belts are actuated to forward the member to the discharge point. Where only a pair of spot welds are required, the member is completely fabricated in one simultaneous, multi-pronged operation. In the fabrication of a number of identical members, the laying-out operation is eliminated after the pre-location of the welders for the initial member.

While the above application is substantially the maximum utilization of the invention, many items can be omitted without elimination of the various novel patentable combinations. This is done for practical reasons and for better patent protection. An instance is where one welder is fixed with the mobile welder relocated manually or by other extraneous means, the shape transported on buggies by gravity, the length of the member determined by a tape and with the shape length-centered by rams powered by individual matched-power motors. Length placement by eye, omitting the rams, would simplify it further.

In the best present fabricating practice dozens of separate machine and manual operations and motions are required, including trucking between machines and manual operating areas. In the system and apparatus set forth, heavy manual labor and physical injuries can be avoided with most human errors and inconsistencies eliminated in the reduction to a single operation. It is claimed this practice is a major improvement in the fabricating art.

While various changes may be made in the detail construction, it shall be understood that such changes shall be within the spirit and scope of the present invention, as defined by the appended claims.

FIGURE 1 shows a plan of the layout of a transverse feed, beam welding machine, consisting of a two rail bed or ways 1 supporting inwardly facing C frame welders 2. At mid-length of the bed, the transverse tie 3 longitudinally anchors a right and left threaded shaft 4 that is threaded through the bases 5 of the welder units 2. At the left end, this shaft, used for symmetrically diverging or convering the welders, terminates in a gear box and speed reducer 6. An attached electric motor 8, through a train of gears, rotates the threaded relocating shaft 4. The control console 9 shown below controls same. A pair of symmetrically located elevated I beams 10, supported by posts 11 on the floor, provides the means to move and support the shape 12 to be fabricated in the jaws of the end fabricators 2. The shape is manually moved along the rails being stopped on the common longitudinal centre line of the fabricators 2 by a solenoid 13 controlled projecting stop pin 14. On completion of the fabrication the pin 14 is depressed, allowing the fabricated member 15 to progress to discharge 16 at the far side as a completely finished beam 15, ready for erection in a structure.

FIGURES 2, 3 and 4 show a front elevation of FIGURE 1. At the left is shown the electric primary service 17 feeding down into the transformer 18 control box 19 mounted on the transformer 18 in the rear. The lower conduit 20 controls the transformer 18 on the opposite end welder 2. Heavy copper conductors 21 of opposite polarity project through the back wall 22 of the C frame welder 2, to contact the welding-die-head-carriers 24 and 30 furnishing secondary welding current thereto. The upper die 24 is attached to the upper fixed platen 25. The piston 26 and piston rod 7 in compressed air cylinder 27 on the base 5 elevate the T-guided 28 table 29 holding the lower die 30.

As shown in FIGURE 4 the cylinders 27' have two inlet ports 34 at the top and bottom. One set of ports is for hydraulic or oil pressure. The other set is for compressed air. For welding and riveting expandable compressed air maintains and holds a constant follow-up pressure to the end of the operation and gives an instantaneous follow-up for the forging pressure after the softening of the metal by the heat. In the case of drilling, fluid pressure without an air pressure bell, can exert a selected pressure against the drill points without the pressure slamming the work piece against the multiple drill box when the drills break through the work piece. Sudden release of the reactive pressure would actuate a simple electrical or mechanical mechanism that would prevent contined pressure as the drills break through.

A projecting lug 31 on the lower carrier-die 30 maintains pressured contact against lower spring-biased conductor 21 bevelled at 32 when in the welding position. In welding, the dual connection angles 33 held in the transversely opposed dies 24 and 30 create a compound-chain weld between the three pieces of steel 33, 12 and 33 by a series circuit across the dual dies. The right-hand welder shows the shape and dies in the converged welding posiiton. On completion of the weld the finished member 15 is lowered to the transmission rails 10 and proceeds to discharge 16 in FIGURE 1.

The lower part of the figure shows a scale 25 attached to the ways of the apparatus with the zero point 36 located transversely across from the centre of the mid-length tie that is the mid-length anchorage and zero transverse measuring axis 3. On the front of the base 5 a vernier plate 37 overlapping the scale has two indicating edges; the right edge 38 located vertically under the outside face of the connection angles 33 measures one-half of the total overall length of the completed member; the left edge 39 located vertically under the inside face of the backwall 41 of the fabricator, measures one-half of the length of the raw shape as follows: with the end fabricators diverged, the shape is pushed against the dual stop pins 14, generally out of the correct longitudinal position as shown by the dotted left hand end 40 of the shape. The end fabricators 2 are then longitudinally converged against the ends of the shape by the threaded shaft 4 with the inside faces 41 of the walls of the fabricators bumping the shape to a longitudinally length-centered position when the resistance of the locked shape through an overload device means automatically shuts off the power. The fabricators are then symmetrically diverged the required distance to the welding position, which will be indicated by the half length dimension on the scale indicated by the right-hand edge 38 of the vernier plate. Where a large number of identical length members are being fabricated, a railstop 42 with a mechanical or electrical trip is set on the bed 1 at the right-hand side to automatically stop the diverging of the fabricators at the correct fabricating measurement.

FIGURE 5 shows an inside end view of the fabricator with the shape supporting rail 10 that is broken away to show the lower die. The parts and functioning are shown in FIGURES 2 to 4.

FIGURE 5a shows the adjustable stop pin 14 apparatus with solenoid 13 withdrawing device, handwheel 43 and screw 44 adjusting device for various depth shapes 12.

FIGURE 6 shows the face of the die 30 slotted 45 for one leg of the connection angle 33 to be nested therein, with raised C-shaped areas 46 at opposite ends of the face for contacting the web of the shape and for preheating the same when required. For pre-heating, the dies are converged, unfilled, against the web of the shape and heat it in a localized area till it is near a white heat. Diverged, they are filled with dual connection angles and when converged on the shape they weld the angles to same. Small ports 47 in the face of the die permit combustible gas as an alternate to issue from same, which when ignited is used for pre-heating. The projection 31 at the left is the contact for the secondary welding current.

FIGURE 6a is an alternate design to localize the preheating and welding current by means of raised circular spots or buttons 48.

FIGURE 7 shows a typical end connection angle 33 in place on the web of a shape 12 overhanging the end of same to achieve the proper overall length of the finished member. The raw shape is always shorter with a length tolerance of one inch.

FIGURE 7a shows the contact face of a connection angle 33 with similar raised projections 46' for localizing the welded areas. This can be used with a flat faced die or the die of FIGURE 6. A flat faced connection angle can be used with the die of FIGURE 6. The leg of the connection angle not shown is usually pre-punched for rivets or bolts.

FIGURE 8 shows a plan-layout of a transverse feed beam welding machine consisting of a two rail bed or ways 1 supporting inwardly facing C frame welders 49. At mid-length of the bed, the transverse tie 3 longitudinally anchors a right and left threaded shaft 4 that is threaded through the bases 5 of the welder units. At the left end, this shaft, used for symmetrically diverging or converging the welders, enters a miter-gear box 50 with a right angled shaft 51 connecting to a speed reducer-gear box 6 with an attached motor 8 drive. Parallel to the threaded shaft, a shaft 52 with a continuous keyway is similarly connected to the aforementioned speed reducer 6 and motor 8. Its purpose will be explained under FIGURE 9. Levers on the speed reducer box 6 control the shafts independently. Console 53, adjoining the speed reducer box 6, controls the operation of the machine. On the far side of the welder base 5, a transformer 18 connected to the dies 54' and 55' of FIGURE 9 by flexible conductor cables 57 and 56 is mounted, moving with the welder 49. On the inside edge of the left welder base 5, posts 60 of FIGS. 9 and 11 mount a transverse horizontal rail 61 carrying a powered 62 steel conveyor belt 63 for the movement of the shapes into and away from the welders. A solenoid 13 controlled stop pin 14 locates the shape as in FIGS. 9 and 10. On the front of the base, direct reading numerical dials 64, driven by shaft 65 geared to the base-moving threaded shaft 4 shown in FIG. 11, indicates one-half the length of the fabricated member, as measured from the mid-length anchorage 3 to the far end of the slots in the welding dies 54–54' and 55–55' of FIGS. 9 and 11. The right-hand welding unit mounts an alternate sloping I beam rail 66 with a light buggy 67, of FIGS. 10 and 12, operating in the upper trough that carries the shape 12 by gravity to the welders and thence to discharge 16.

FIGURES 9 and 10 show a front elevation of the machine with the base of the left-hand welding unit cut away to show the dimension-dial connections 65 to shaft 4. As in FIGURES 2 and 4, the piston 26 in the cylinder 27 on the base elevates the guided table or platen 29 holding the adjustable-length carrier-welding-die 54–54' of FIG. 14, insulated from the table. The said die carries the shape vertically upward against a similar die 55–55' secured to the upper fixed platen 25 on the overhead arm of the C frame, with the flexible cables 56, 58 and 57, 59 from the transformer 18 furnishing the secondary welding current for a series circuit across the dies to effect a compound-chain weld between the three pieces of metal. The longitudinally keyed shaft 52 passes through a gear box 68 located on the back wall of the welder 49. By means of the shaft 69 and trains of gears in boxes 68 and 70 a racked plunger 71 is projected against the end of the shape 12. In conjunction with the simultaneously actuated plunger of the opposed right-end welding unit, the plungers length-center the shape over the mid-length anchorage and measuring axis 3. A scale 72, adjacent to the outer end of the plunger 71, measures the travel of the end of the plunger beyond the outer face of slot 23 of the carrier die 55'. The said dimension indicates the overhang of the connection angle or the lack of same. This dimension is important to the proper strength and fitting of the member. The dial dimension, less the plunger travel multiplied by two, gives the length of the raw shape. On the inside edge of the base is shown the motor 62, speed reducer, sprockets 73, roller chain conveyor 63, and the solenoid controlled stop pin 14, for the transmission, arresting and locating of the shape under the welder head. Unless otherwise shown, the reference numbers for FIGURES 9 and 10 are the same.

In FIGURE 10 a motor 74, speed reducer-gear box 75 and elevating screw 76 are shown as an alternate for the piston-in-cylinder. The speed and thrust of the motor may be varied. A gear shift (not shown) with suitable gearing would further vary the speed and thrust. A mechanical or electrical clutch with overload throw-out would limit the thrust of the lower platen. A buggy 67, transversely operable in the trough of an H shape 66 sloping to the rear and supported by posts 60 on the welder base 5, provides support and gravity transporting of the work-shape 12 across the welder jaws. This minimum unpowered apparatus, moving with the welders, accommodates any length of member.

FIGURE 11 shows an inside end view of the welder with the conveyor broken away to show a two-part die 54–54' adjustable for different depth beams 12 by a right and left screw 77 threaded through the lower parts of the split die. An adjusting hand wheel 78 is shown at the top die 55–55'. The dial mechanism 64 with shaft 65 and gearing is in the base. Separate electric circuits 56–57 and 58–59 are run to corresponding separated parts of the welding heads 55'–54' and 55–54, with a distributor or make and break contacts 86 in the transformer case 18, consecutively energizing the separate circuits whereby the instantaneous current demand and the size of the transformer and the primary distribution feeders can be considerably reduced.

FIGURE 12 shows the shape carrying buggy 67 with a roller 79 for smooth longitudinal centering of the shape, set in the trough of the sloping H beam rail 66 for the gravity feeding of the shape across the apparatus. This enables the shape to be correctly located manually without powered rams.

FIGURE 13 is a cross-section of the buggy 67.

FIGURE 14 shows a plan view of the contact faces of an alternate two-part die 54''–54''' with plural, short-line, raised surfaces at each end for localized pre-heating and welding.

I claim:

1. A resistance welder-fabricator for the pre-heating and welded assembly of structural members, comprising a C-shaped frame with transversely T-slotted platen overhanging the base for the insertion of slotted angle-carrier-electrode blocks of various lengths, having plural face protuberances carrying a connection angle, mating T-slotted lower platen with a vertically aligned mating angle-carrying-electrode block vertically elevatable by an attached piston in a base mounted cylinder with fluid pressure means, projecting lugs on said blocks contacting opposite terminal legs of an electric welding current supply means, whereby the said piston raises an intermediately located shape, converging dual connection angles against opposite faces of said shape, creating plural compound-chain spot welds between four flat surfaces through a single series circuit of the two electrodes, including shape pre-heating by energized converged empty electrode blocks.

2. A resistance welder as claimed in claim 1, further comprising a powered transverse conveyor belt on the front end of said welder whereby a longitudinally extending shape is moved transversely into the said welder intermediately of the said platens and subsequently conveyed further to discharge.

3. A resistance welder, as claimed in claim 1: a dual welding and pre-heating apparatus comprising a supporting frame to guide convergible facing mated angle-carrier-electrode blocks connected to opposite legs of an electric welding circuit supply means with lengthwise slots in contact faces of said blocks to carry dual connection angles, and plural welding spot protuberances on said faces to resistance weld said dual connection angles to opposite faces of an intermediately located shape by block-converging means effecting localized compound-chain spot welds between the three contacting elements through a single series circuit and electric current means with pre-heating of thick shapes by converging of energized empty blocks on the said shape.

4. A resistance welder, as claimed in claim 1, a shape length-centering apparatus for symmetrically spaceable dual co-ordinated fabricators, comprising a longitudinally keyed rotatable shaft operating through and actuating dual trains of shafts and gears keyed to said shaft, with said gears equally projecting dual opposed longitudinal rams on said welders against the opposite ends of an intermediate shape of any length thereby locating the mid-length point of said shape over the common mid-length reference point of the said welders to locate said fabricator's operations equidistant from each end of said shape.

5. A resistance welder, as claimed in claim 1, a dual shape transmission apparatus for variably spaceable co-ordinated dual fabricators, comprising elevated transversely sloping transverse beams on inner ends of bases of said fabricators with transversely movable wheeled buggies operable in the troughs of said beams, transverse rollers mounted on said buggies to carry longitudinally extending shapes by gravity into and across said fabricators, whereby said rollers permit free longitudinal adjustment of said shape, lower fabricator die enters vertical trough of said shape, raises it against the mated fabricating head, lowers it after fabrication and frees it for discharge travel.

6. A resistance welder for fabricating structural members of any depth, flange width and weight, comprising a C-shaped frame with a transversely T-slotted platen overhanging the base, a mating T-slotted lower platen vertically elevatable by an attached piston in a base mounted cylinder, with fluid pressure means, two-part angle-carrier-electrode blocks horizontally adjustable for any length of each connection angle by a common screw oppositely threaded through said paired blocks T-keyed to said plural platens, welding spot protuberances on faces of said blocks, plural independent series circuit means for supplying electric current to vertically aligned blocks of opposite polarity whereby the said piston raises the intermediately located shape, converging dual connection angles carried in said blocks against opposite web faces of said shape, and creating plural pairs of compound-chain spot welds, variably spaced, through said member elements by successive welding currents through plural series circuits.

7. A resistance welder as in claim 6, further comprising an elevated transversely extending beam on the front end of the said welder base for the support of a longitudinally extending shape intermediately located between said platens whereby the said lower electrode block enters the lower trough of said shape raising it for said fabrication after which lowering of the block frees the said shape for movement out of the operating area.

8. A resistance welder, as claimed in claim 1, a structural fabricating apparatus, comprising co-ordinated dual welding means spaceable along a longitudinal track by a powered threaded shaft to fit any length of member, transversely extending powered dual shape conveying belts integral with inner ends of bases of said welders to move a longitudinally extending shape into the operating areas of said welders and after fabrication to discharge, longitudinally opposed rams on said welders equally extendible against ends of shape by individual motors of equal thrust to locate ends of shape equi-distant from said welders for welding of dual connection angles to opposite web faces of said shape ends by said welders and electric current.

References Cited by the Examiner
UNITED STATES PATENTS

| | | | |
|---|---|---|---|
| 1,052,753 | 2/1913 | Rietzel | 219—86 |
| 1,968,079 | 7/1934 | Hoffer | 219—101 |
| 2,146,332 | 2/1939 | Deming | 219—117 X |
| 2,533,605 | 12/1950 | Mueller | 219—9.5 X |
| 2,588,062 | 3/1952 | Vorderstrasse | 219—56 |
| 3,085,148 | 4/1963 | McConnell | 219—139 |

ANTHONY BARTIS, *Acting Primary Examiner.*

RICHARD M. WOOD, *Examiner.*

R. F. STAUBLY, *Assistant Examiner.*